US012737610B2

(12) United States Patent
Mahkonen et al.

(10) Patent No.: US 12,737,610 B2
(45) Date of Patent: Sep. 15, 2026

(54) ARCHITECTURE FOR UTILIZING KEY-VALUE STORE FOR DISTRIBUTED NEURAL NETWORKS AND DEEP LEARNING

(71) Applicant: Telefonaktiebolaget LM Ericsson (publ), Stockholm (SE)

(72) Inventors: Heikki Mahkonen, Redondo Beach, CA (US); Wassim Haddad, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1120 days.

(21) Appl. No.: 17/286,812

(22) PCT Filed: Oct. 23, 2018

(86) PCT No.: PCT/IB2018/058225

§ 371 (c)(1),
(2) Date: Apr. 19, 2021

(87) PCT Pub. No.: WO2020/084329

PCT Pub. Date: Apr. 30, 2020

(65) Prior Publication Data

US 2021/0374530 A1 Dec. 2, 2021

(51) Int. Cl.
*G06N 3/08* (2023.01)

(52) U.S. Cl.
CPC .................................... *G06N 3/08* (2013.01)

(58) Field of Classification Search
CPC ........................................................ G06N 3/08
See application file for complete search history.

(56) References Cited

U.S. PATENT DOCUMENTS

2018/0131516 A1* 5/2018 Meng .................... H04L 9/0643
2018/0233133 A1 8/2018 Hilal et al.
2020/0151392 A1* 5/2020 Crabtree ................ G06N 5/022
2020/0159563 A1* 5/2020 Luo ..................... G06F 9/45558

OTHER PUBLICATIONS

Ladwig, G., & Harth, A. (Oct. 2011). CumulusRDF: linked data management on nested key-value stores. In The 7th International Workshop on Scalable Semantic Web Knowledge Base Systems (SSWS 2011) (vol. 30). (Year: 2011).*
Meng, F., Tu, Z., Cheng, Y., Wu, H., Zhai, J., Yang, Y., & Wang, D. (Jun. 2018). Neural machine translation with key-value memory-augmented attention. arXiv preprint arXiv:1806.11249. (Year: 2018).*
(Continued)

*Primary Examiner* — Michael J Huntley
*Assistant Examiner* — Maggie Thanh Maido
(74) *Attorney, Agent, or Firm* — Nicholson De Vos Webster & Elliott LLP

(57) ABSTRACT

A method and system for implementing a neural node in a neural network in a key value store (KVS) system. The method and system monitor a first KVS key of the neural node for an update of an input value. The method and system execute a microfunction for the neural node on the input value to generate an output value, in response to detecting a change in the input value and write the output value to a second KVS key for an output neural node.

11 Claims, 14 Drawing Sheets

(56) References Cited

OTHER PUBLICATIONS

István, Z., Alonso, G., & Singla, A. (Aug. 2018). Providing multi-tenant services with FPGAs: Case study on a key-value store. In 2018 28th International Conference on Field Programmable Logic and Applications (FPL) (pp. 119-1195). IEEE. (Year: 2018).*

Zhang, H. J., & Xiao, N. F. (Feb. 2015). Parallel implementation of multilayered neural networks based on Map-Reduce on cloud computing clusters. Soft Computing, 20(4), 1471-1483. (Year: 2015).*

Cui, H., Zhang, H., Ganger, G. R., Gibbons, P. B., & Xing, E. P. (Apr. 2016). Geeps: Scalable deep learning on distributed gpus with a gpu-specialized parameter server. In Proceedings of the eleventh european conference on computer systems (pp. 1-16). (Year: 2016).*

Sun, C., Zhang, Y., Yu, W., Zhang, R., Bhuiyan, M. Z. A., & Li, J. (Jun. 2017). DPS: A DSM-based parameter server for machine learning. In 2017 14th International Symposium on Pervasive Systems, Algorithms and Networks, (ISPAN-FCST-ISCC) (pp. 20-27). IEEE. (Year: 2017).*

"RAMCloud Project," downloaded from https://ramcloud.atlassian.net/wiki/spaces/RAM/overview?mode=global on Apr. 8, 2021, 5 pages.

Dormando, "About Memcached," copyright 2009-2018, downloaded from https://memcached.org/about on Apr. 8, 2021, 3 pages.

Garcia-Loygorri, J., "Conclusions about distributed neural networks with Tensorflow," Artificial Intelligence, BBVA Labs, Sep. 27, 2017, downloaded from https://www.bbva.com/en/conclusions-distributed-neural-networks-tensorflow/ on Apr. 8, 2021, 13 pages.

Luo et al., "Parameter Hub: a Rack-Scale Parameter Server for Distributed Deep Neural Network Training", Cornell University Library, May 21, 2018, 16 pages.

Meng et al., "Neural Machine Translation with Key-Value Memory-Augmented Attention", Cornell University Library, Jun. 29, 2018, 8 pages.

Moritz, et al., "Ray: A Distributed Framework for Emerging AI Applications," 13th USENIX Symposium on Operating Systems Design and Implementation, Sep. 30, 2018, 17 pages.

Nemeth, et al., "DAL: A Locality-Optimizing Distributed Shared Memory System," Ericsson, HotCloud '17, Jul. 10, 2017, downloaded from https://www.usenix.org/sites/default/files/conference/protected-files/hotcloud17_slides_nemeth.pdf on Apr. 8, 2021, 18 pages.

Nielsen, M., "Neural Networks and Deep Learning," Determination Press, 2015, downloaded from http://neuralnetworksanddeeplearning.com/index.html on Apr. 8, 2021, 2 pages.

Redis, Open Source Software, archived Oct. 22, 2018, downloaded from https://web.archive.org/web/20181022063535/https://redis.io/ on Apr. 8, 2021, 1 page.

Skymind Inc., "Distributed Deep Learning, Part 1: An Introduction to Distributed Training of Neural Networks," Distributed Training, Nov. 30, 2017, downloaded from https://web.archive.org/web/20190423004926/https://blog.skymind.ai/distributed-deep-learning-part-1-an-introduction-to-distributed-training-of-neural-networks/ on Apr. 8, 2021, 23 pages.

The Apache Software Foundation, "Cassandra," archived Oct. 22, 2018, downloaded from https://web.archive.org/web/20181022093229/https://cassandra.apache.org/ on Apr. 8, 2021, 3 pages.

Wikipedia, "Key-value database," downloaded from https://en.wikipedia.org/wiki/Key%E2%80%93value_database on Apr. 8, 2021, 4 pages.

* cited by examiner

```
abba/
  cafe/
    1
    2
    3
    4
    5
    6
    7
    8
    9
    a
    b
    c
    d
    e
    result
```

...

```
abba/
  cafe/
    1 -> 0.56784
    2 -> 0.4532
    3 -> 0
    4
    5
    6
    7
    8
    9
    a
    b
    c
    d
    e
    result
```

...

```
abba/
  cafe/
    1
    2 -> 0.4532
    3 -> 0
    4 -> {1:0.56784}
    5 -> {1:0.56784}
    6 -> {1:0.56784}
    7 -> {1:0.56784}
    8
    9
    a
    b
    c
    d
    e
    result
```

FIG. 5A

```
abba/
  cafe/
    1
    2
    3 -> 0
    4 -> {1:0.56784, 2:0.4532}
    5 -> {1:0.56784, 2:0.4532}
    6 -> {1:0.56784, 2:0.4532}
    7 -> {1:0.56784, 2:0.4532}
    8
    9
    a
    b
    c
    d
    e
    result
```

...

```
abba/
  cafe/
    1
    2
    3
    4 -> {1:0.56784, 2:0.4532, 3:0}
    5 -> {1:0.56784, 2:0.4532, 3:0}
    6 -> {1:0.56784, 2:0.4532, 3:0}
    7 -> {1:0.56784, 2:0.4532, 3:0}
    8
    9
    a
    b
    c
    d
    e
    result
```

FIG. 5B

```
abba/
  cafe/
    1
    2
    3
    4 -> {1:0.56784, 2:0.4532, 3:0}
    5 -> {1:0.56784, 2:0.4532, 3:0}
    6 -> {1:0.56784, 2:0.4532, 3:0}
    7 -> {1:0.56784, 2:0.4532, 3:0}
    8
    9
    a
    b
    c
    d
    e
    result
```

...

```
abba/
  cafe/
    1
    2
    3
    4
    5
    6
    7
    8 -> {4:0.2365, 5:0.111, 6:0.345, 7:0.999}
    9 -> {4:0.2365, 5:0.111, 6:0.345, 7:0.999}
    a -> {4:0.2365, 5:0.111, 6:0.345, 7:0.999}
    b -> {4:0.2365, 5:0.111, 6:0.345, 7:0.999}
    c
    d
    e
    result
```

FIG. 5C

```
abba/
  cafe/
    1
    2
    3
    4
    5
    6
    7
    8
    9
    a
    b
    c -> {8:0.2543, 9:0.9879, a:0.1101, b:0.123}
    d -> {8:0.2543, 9:0.9879, a:0.1101, b:0.123}
    e -> {8:0.2543, 9:0.9879, a:0.1101, b:0.123}
    result
```

...

```
abba/
  cafe/
    1
    2
    3
    4
    5
    6
    7
    8
    9
    a
    b
    c
    d
    e
    result -> {c:0, d:1, e:0}
```

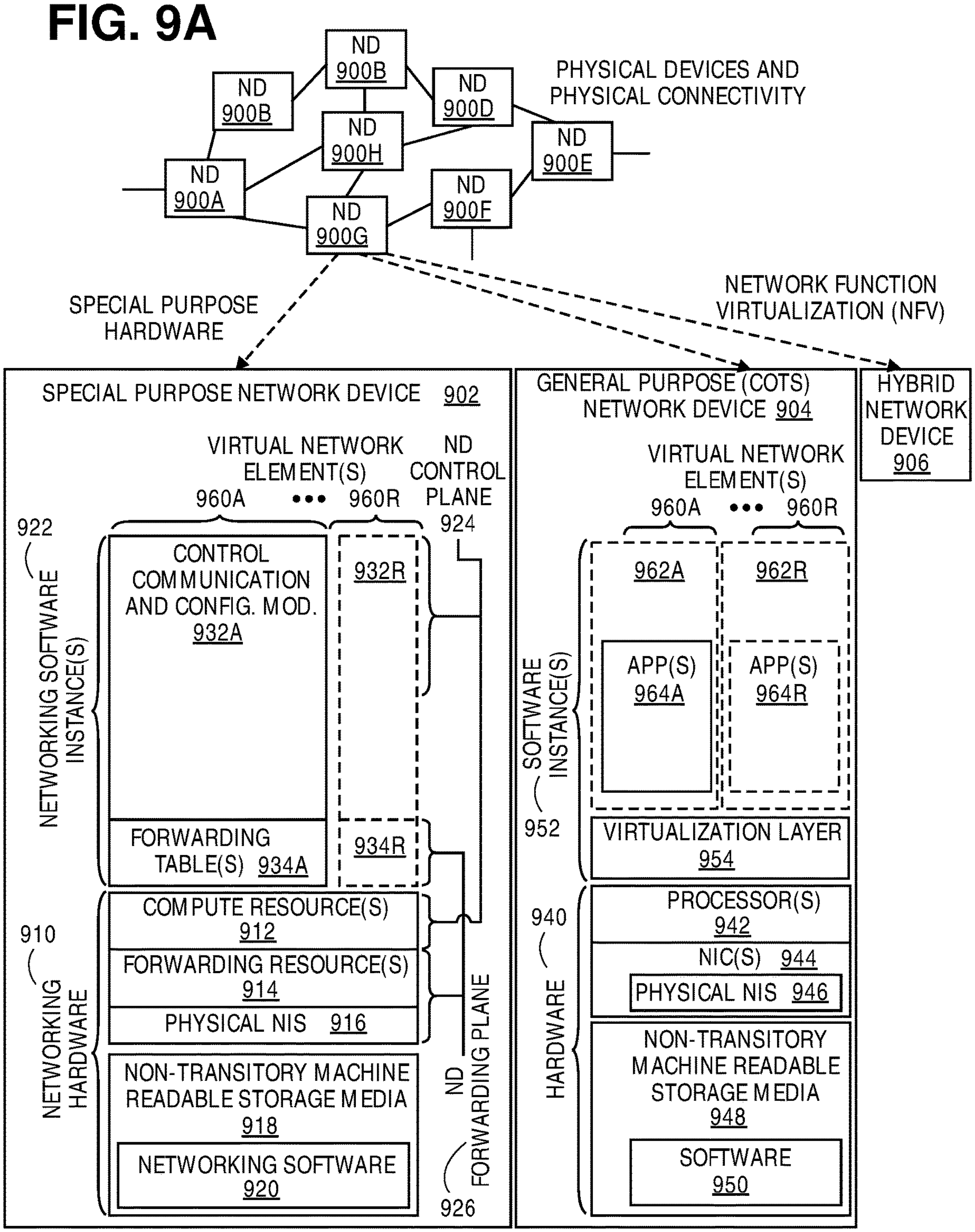

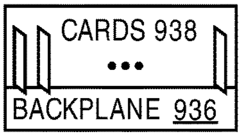

FIG. 9B

ND 900B
ND 900B
ND 900D
PHYSICAL DEVICES AND PHYSICAL CONNECTIVITY
ND 900H
ND 900E
ND 900A
ND 900G
ND 900F

SPECIAL PURPOSE HARDWARE
NETWORK FUNCTION VIRTUALIZATION (NFV)

SPECIAL PURPOSE NETWORK DEVICE 902
VIRTUAL NETWORK ELEMENT(S)
960A ••• 960R
ND CONTROL PLANE 924
922
NETWORKING SOFTWARE INSTANCE(S)
CONTROL COMMUNICATION AND CONFIG. MOD. 932A
932R
FORWARDING TABLE(S) 934A
934R
910
NETWORKING HARDWARE
COMPUTE RESOURCE(S) 912
FORWARDING RESOURCE(S) 914
PHYSICAL NIS 916
NON-TRANSITORY MACHINE READABLE STORAGE MEDIA 918
NETWORKING SOFTWARE 920
ND FORWARDING PLANE
926

GENERAL PURPOSE (COTS) NETWORK DEVICE 904
VIRTUAL NETWORK ELEMENT(S)
960A ••• 960R
962A
962R
APP(S) 964A
APP(S) 964R
SOFTWARE INSTANCE(S)
952
VIRTUALIZATION LAYER 954
940
HARDWARE
PROCESSOR(S) 942
NIC(S) 944
PHYSICAL NIS 946
NON-TRANSITORY MACHINE READABLE STORAGE MEDIA 948
SOFTWARE 950

HYBRID NETWORK DEVICE 906

CENTRALIZED APPROACH (SDN) 974

DISTRIBUTED APPROACH 972

APPLICATION(S) 988

APPLICATION LAYER 986

NORTH BOUND INTERFACE 984

VIRTUAL NETWORK(S) 992

CENTRALIZED CONTROL PLANE 976

NETWORK CONTROLLER 978

CENTRALIZED REACHABILITY AND FORWARDING INFO. MOD. 979

SOUTH BOUND INTERFACE 982

DATA PLANE 980

NE 970A

NE 970B

NE 970C

NE 970D

NE 970E

NE 970F

NE 970G

NE 970H

NE 970I

NE 970D

NE 970E

NE 970F

SINGLE VNE 970T

ND 900A

VNE 970A.1

ND 900H

VNE 970H.1

ARCHITECTURE FOR UTILIZING KEY-VALUE STORE FOR DISTRIBUTED NEURAL NETWORKS AND DEEP LEARNING

CROSS-REFERENCE TO RELATED APPLICATIONS

This application is a national stage of International Application No. PCT/IB2018/058225, filed Oct. 23, 2018, which is hereby incorporated by reference.

TECHNICAL FIELD

Embodiments of the invention relate to the field of neural networks and deep learning; and more specifically, to an architecture utilizing key-value stores to efficiently implement distributed neural networks.

BACKGROUND ART

Neural networks are a machine learning technology that is inspired by biology. Neural networks provide the best solutions to many problems in image and speech recognition and natural language processing. Neural networks are built from nodes also called neurons or perceptrons that are connected together as a network or a graph by input and output links referred to as 'synapses.' Each neuron receives a set of inputs, executes a non-linear function on these inputs and then outputs the result of this function. To program a neural network to provide solutions to particular tasks, the neural network needs to be trained since the neurons are not programmed with a function that is specific to the task they are applied to solve. The neurons are trained with input that have a known result. In the process of being trained the neurons learn parameters for computation of the correct output. There are many techniques for learning; supervised learning, unsupervised learning and reinforcement learning.

Many machine learning frameworks utilize graphic processing units (GPUs) to provide more compute power for costly learning stages. Even though GPUs provide more computing power for deep learning it can still take a lot of time to execute learning on a single node. In recent years, many new frameworks and algorithms have been devised to distribute the learning process over multiple servers. When distributing a neural network over multiple servers, two paradigms can be chosen, either model parallelism or data parallelism. In some cases, a combination of both models is utilized. In model parallelism, the neural network model is divided into subsets that are distributed to different servers. In data parallelism, each machine has a fragment of training data, but a complete copy of the neural network model. In practice, distributed neural networks usually implement data parallelism as it is easier to implement, it is more fault tolerant and it achieves better server utilization. Model parallelism would provide better scalability for large models.

Key-value stores (KVS) are data storage systems designed to store, retrieve and manage associative key to value hashes. In KVS, data is associated with a key when stored and the same key is used to retrieve or delete the data from the KVS. The KVS can be distributed to form a large cluster to scale up the amount of data stored in the KVS and to reduce access delays, by moving stored data closer to the consumers or producers of the data. The distributed KVS handles consistency of the data throughout the cluster by utilizing a consistency protocol. There are many opensource projects that provide implementations of KVS, e.g. Redis by Redis Labs, Memcached (memcached.org), and RAMCloud (ramcloud.atlassian.net). Also, distributed databases like Casandra by Apache Software Foundation can be used as KVS with the correct abstractions applied.

SUMMARY

In one embodiment, a method is implemented by a computing device to execute a neural node in a neural network in a key value store (KVS) system. The method includes monitoring a first KVS key of the neural node for an update of an input value, executing a microfunction for the neural node on the input value to generate an output value, in response to detecting a change in the input value, and writing the output value to a second KVS key for an output neural node.

In another embodiment, a network device implements the neural node in the neural network in the KVS system. The network device is in communication with or executing the KVS system. The network device includes a non-transitory computer-readable medium having stored therein a microfunction runtime environment, and a processor coupled to the non-transitory computer-readable medium. The processor executes the microfunction runtime environment. The microfunction runtime environment monitors the first KVS key of the neural node for an update of an input value, to execute a microfunction for the neural node on the input value to generate an output value, in response to detecting a change in the input value, and to write the output value to a second KVS key for an output neural node.

In a further embodiment, a non-transitory computer-readable medium has stored therein a set of instructions, which when executed by a computing system, cause the computing system to perform a set of operations. The computing system executes the neural node in the neural network in the KVS system. The set of operations include monitoring a first KVS key of the neural node for an update of an input value, executing a microfunction for the neural node on the input value to generate an output value, in response to detecting a change in the input value, and writing the output value to a second KVS key for an output neural node.

BRIEF DESCRIPTION OF THE DRAWINGS

The invention may best be understood by referring to the following description and accompanying drawings that are used to illustrate embodiments of the invention. In the drawings:

FIGS. 5A-5D are diagrams of example data processing in a KVS implemented neural network.

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

DETAILED DESCRIPTION

Figure 1:
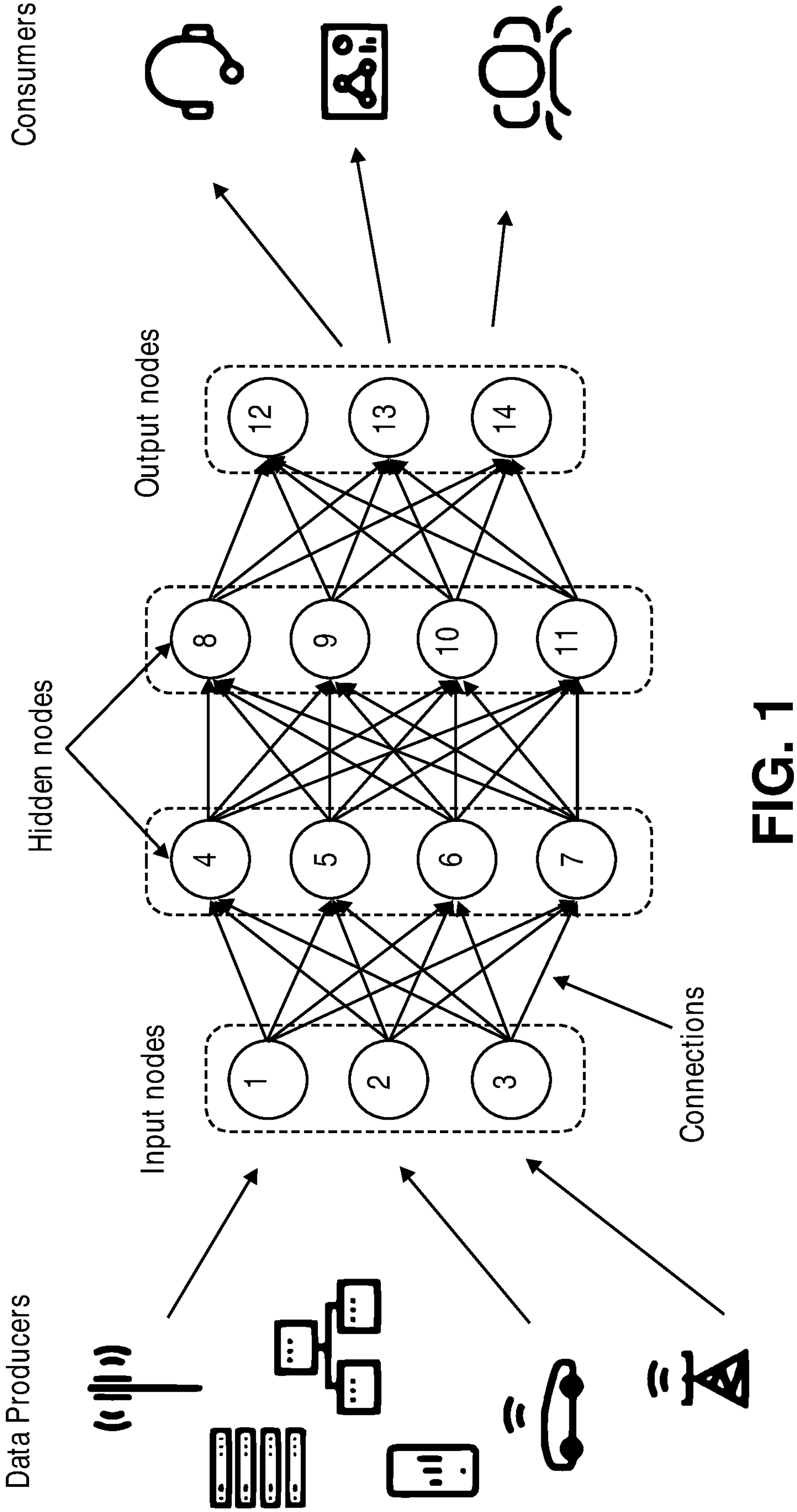
FIG. 1 is a diagram of one embodiment of a distributed neural network.

The following description describes methods and apparatus for utilizing distributed key value store (KVS) and serverless computing to enable massively scalable distributed neural network architecture. The embodiments provide a process and system for mapping a distributed neural network into a KVS. The embodiments of the distributed neural network are a machine learning architecture that combines model and data parallelism through KVS. In some embodiments, the KVS and distributed neural network architecture utilizes serverless cloud native compute with a microfunction as a service (μFaaS) framework that ensures computation over data happens collocated with the data and once the computation is complete the resources can be freed to be used for other purposes. The embodiments include an example mechanism to use the KVS keys to uniquely identify neurons that belong to a specific neural network and how to utilize these keys for neural network inputs and output. The embodiments also define an example functionality to implement a neuron as a microfunction that can execute anywhere in the KVS cluster as the key it is associated with is changed.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

Overview

As implemented today distributed neural networks cannot scale to infinity. This is because bottlenecks arise with data distribution within the neural networks. These bottlenecks are caused by limitations in the available network bandwidth in datacenters. The bandwidth can be limited between workers and parameter servers, or resource availability, such as a limited amount of central processing unit (CPU), graphical processing unit (GPU), and memory resources in the datacenter. In addition, the machine learning frameworks require static deployment into the datacenter compute resources. This means that if a learning task runs out of resources and new resources are needed, then execution needs to be stopped and new resources onboarded to the cluster before computation can be restarted. Machine learning libraries can be utilized in the datacenter to ameliorate this problem but even with such libraries workers are limited to run in the compute resources dedicated to the machine learning framework. These datacenter machine learning implementations spawn worker slowly and the implementation language is limited to Python. The workers in the datacenter function separate from the object store, which requires costly calls to access data.

The embodiments disclosed herein overcome these limitations of that art. The embodiments provide a distributed machine learning architecture that combines model and data parallelism through key value stores (KVS). The distributed machine learning architecture provides a serverless cloud native compute with μFaaS framework that ensures computation over data happens collocated with the data. The distributed machine learning architecture enables resources to be freed once the computation is over to be used for other purposes. The embodiments are described with relation to an example mechanism that uses the KVS keys to uniquely identify neurons that belong to a specific neural network and how to utilize these keys for neural network inputs and output. The embodiments also describe an example functionality to implement a neuron as a microfunction that can execute anywhere in the KVS cluster as the key associated with the microfunction is changed.

The embodiments provide, a distributed machine learning architecture that executes a whole neural network that is 'encoded' into the KVS. The whole KVS cluster can be utilized for the distributed neural network. In addition, new servers can be added to the data center and the distributed machine learning architecture will handle data and function distribution automatically and dynamically to incorporate the new servers. If any servers in the datacenter fail, then a consistency protocol of the distributed machine learning architecture will handle necessary data replication. Thus, the embodiments provide a distributed machine learning architecture that is more scalable, resilient and simple to maintain data and model distribution. The distributed machine learning architecture including a KVS cluster can be distributed geographically, deployed in central datacenter, distributed edge cloud, in any general-purpose hardware running for example in cellular access network or even in end-user devices, IoT devices or connected vehicles. The distributed machine learning architecture utilizes the same KVS to distribute data and to orchestrate the compute for the data. The compute resources are collocated close together with the data to be processed, which leads to more optimal input/output (I/O) operations. The organization of the distributed machine learning architecture also enables data to be inputted from multiple places, e.g., by providing write access to input links in the KVS. The distributed machine learning architecture enables consumption of results from the neural network computations from multiple places, e.g., by providing read access to the output links.

Distributed Machine Learning Architecture

The distributed machine learning architecture enables a distribution of a neural network over compute and storage resources. The embodiments include the example of a neural network distributed with KVS and supporting the use of microfunctions. The embodiments are described with relation to this example embodiment by way of example and not limitation. One skilled in the art would appreciate that the principles and structures of the embodiments are also applicable to other storage and machine learning systems.

FIG. 1 is a diagram of one embodiment of a distributed neural network. The data for training a neural network can be collected from multiple sources (e.g., from consumers or users of the neural network). A large dataset may be utilized from such sources to train the neural network and once a reasonable error tolerance is achieved from training on the data, then the consumers can utilize the neural network in real time to perform various functions that the neural network has been trained to execute, for example image or speech recognition.

Data is written into a neural network via input nodes or neurons that handle distribution of the data to a set of weighted compute nodes, i.e., neurons, organized as any number of hidden layers. The input nodes (e.g., nodes 1 to 3) can receive input data from any number or variety of sources during the execution of the neural network. Each input node can have a 1:1 relationship with a data producer. The type and semantics of the input data can vary based on the task the neural network has trained for. For example, if the neural network is trained for image recognition then the set of input nodes can receive a pixel or similar sub-section of an input image to be processed.

There can be any number of hidden nodes or neurons and they can be connected to each other in any way possible with the input/output links, i.e. synapses. The hidden nodes can be configured to execute a single function that manipulates a weight specific to the instance of the node. The weight is adjusted based on training feedback. The node receives a set of input values from the input nodes or nodes in other layers of the neural network and generates a set of output values that are written to the next layer of the hidden nodes or to the output nodes.

To obtain an output from the neural network, one or more output nodes are present in the network. The result of the execution of the set of hidden nodes in neural network on the input data is readable from these output nodes (e.g., the output nodes 12-14). The number of output nodes in the neural network varies depending on the use cases. Each output node can output a value with a different semantic. Any number of consumers can utilize the output data from the neural network, where the consumer can be any type of device communicatively connected to the output nodes.

Figure 2:
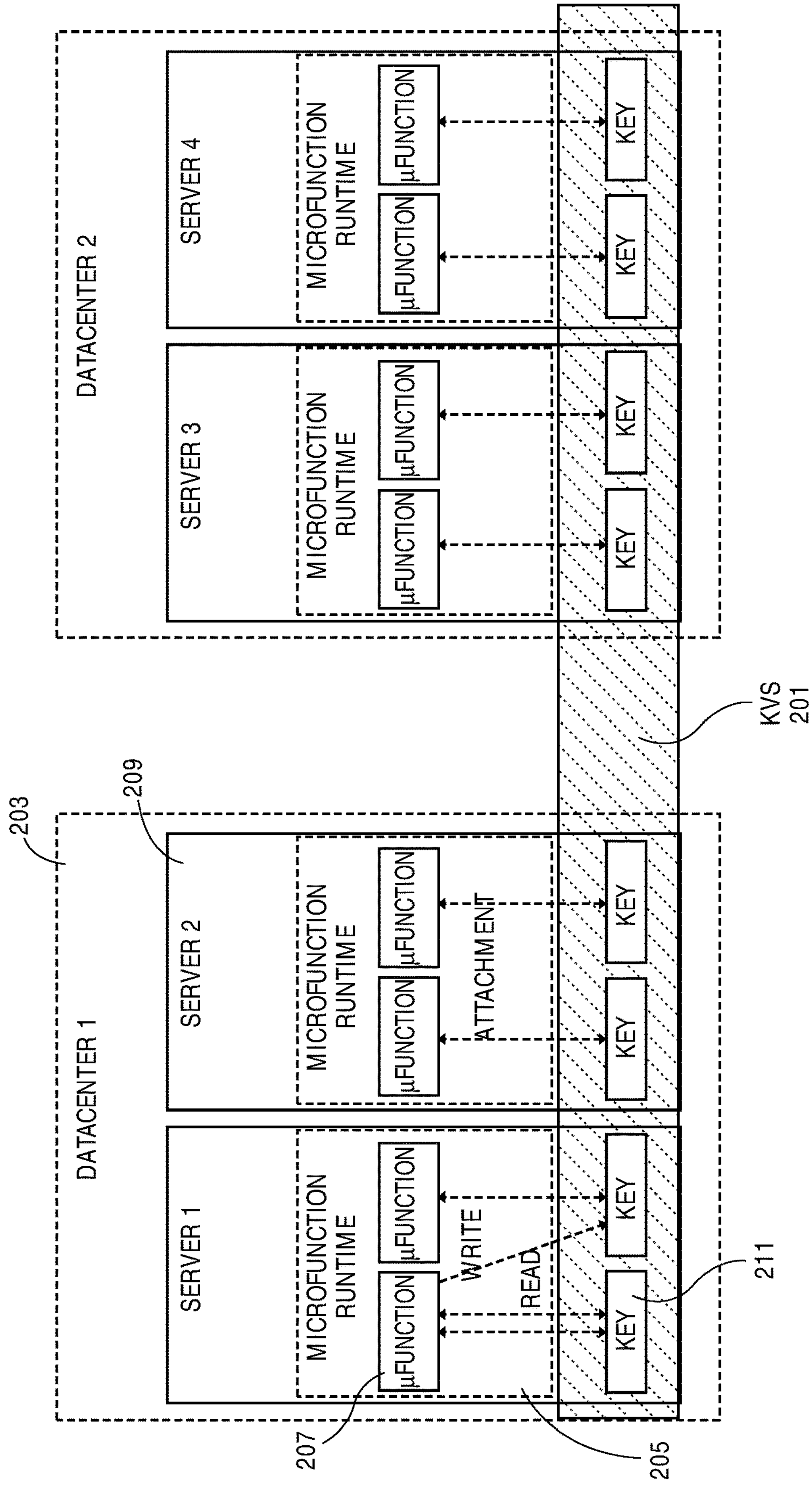
FIG. 2 is a diagram of one embodiment of a deployment of KVS with a microfunction framework.

FIG. 2 is a diagram of one embodiment of a deployment of KVS with a microfunction framework. The embodiments include a deployment of a KVS cluster together with microfunction execution environment. A KVS cluster is a grouping of servers that are implementing a distributed KVS system. The KVS cluster can span multiple datacenters and any number of physical servers. In addition, the KVS cluster can utilize or communicate with physical machines connected to the KVS from outside of the datacenter like neural network data producers and consumers. The KVS defines a set of keys that are each associated with specific data (values). The data is stored in the form of associative arrays, e.g., hash tables. The key is utilized to store and retrieve the associated data.

In addition, in microfunction frameworks keys can be associated with functions (i.e., as set of instructions) that can be executed when keys are modified (i.e., when a key is written to). When data is written to a key an orchestration event is triggered that executes the function associated with the key and the data written can be automatically passed to the function or the function can be configured with other keys where the microfunction can access data and keys where the microfunction can write data to. Since the function invocation occurs in combination with the key change this means that the function will be executed in the server that currently is acting as the master of the key. Depending on the consistency protocol used by the KVS system, there can be any number of slaves to particular keys that the process can fall back to if the master fails.

As illustrated, each datacenter 203 can include a set of physical servers 209. The set of physical servers 209 provide compute resources for implementing the embodiments of the distributed machine learning architecture. A set of microfunction runtime environments 205 can be distributed and executed by the set of physical servers 209. The set of microfunction runtime environments 205 execute a set of microfunctions 207 that are associated with keys 211 for the KVS 201. The microfunctions 207 can write to keys 211, read from keys 211, or be associated with or 'attached' to keys 211, where the attachment can indicate an invocation related to the access of the key 211.

Figure 3:
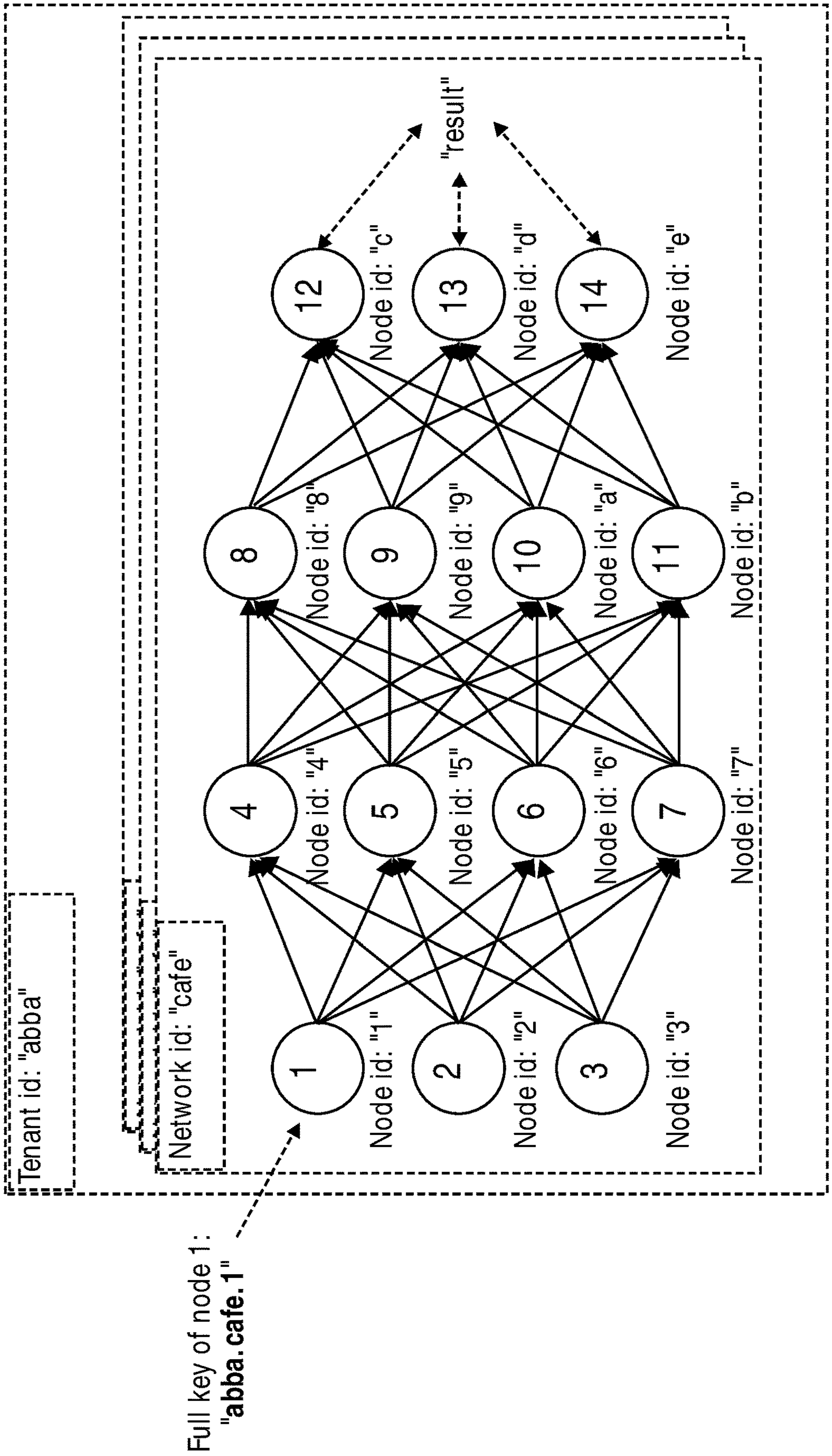
FIG. 3 is a diagram of one embodiment of a neural network encoded into a KVS system.

This underlying physical architecture of the distributed machine learning architecture can be utilized to implement distributed neural networks as discussed in relation to FIG. 3.

FIG. 3 is a diagram of one embodiment a neural network encoded into a KVS system. FIG. 3 illustrates the example neural network in FIG. 1 being mapped into a distributed machine learning architecture using the KVS cluster. The neurons or nodes of the neural network can be distributed as illustrated in FIG. 3. The distributed machine learning architecture can utilize any algorithm to decide which neurons are to be located in which physical server and/or datacenter. In some embodiments, the KVS system will include algorithms to dynamically distribute keys based on resource usage associated with the keys. This distribution mechanism can be configured such that the compute associated with specific keys can be executed at any available location as needed. In some embodiments, more specific control of the neuron distribution is implemented with policy controls or similar rules that are applied to the distribution mechanism.

As illustrated in FIG. 3, each node is assigned a KVS key and is distributed to a specific server that is currently the master of the corresponding key. The correlated microfunction is also collocated to the microfunction runtime environment in that same server. For example, node 1 assigned to physical server 1 will read its input from key 1 and provide output to keys 4, 5, 6 and 7. Similarly, node 7 assigned to server 2 will get inputs from key 7 and provide output to keys 8, 9, 10 and 11. Because multiple nodes 1, 2 and 3 are writing to key 7 the microfunction must either handle this internally (an example of this is described hereinbelow), a separate special node can be introduced that handles the aggregation or the KVS system can be configured to handle the aggregation of the input data. Similarly, the writing to multiple output links by a node can either be handled within the microfunction or a separate microfunction can be introduced to 'multicast' data to multiple nodes.

To encode a neural network into a KVS cluster a unique key for each node can be used. There can be many different mechanisms to form these keys but for example a prefixed key format can be utilized as illustrated. A prefix of the key can be formed from a tenant identifier of the user or owner of the neural network, for example, a general user identifier (GUID) of the tenant or tenant name; a neural network identifier, a user might have multiple neural networks in the system at the same time, which can be an incremental number of GUID of the network; and a node identifier where each neural network must have a unique node identifier for each node. An example node identifier is an incremental node index.

Using these prefixes, the distributed machine learning architecture can form a unique key string for each node in the distributed neural network. For example, by concatenating these prefixes with a separator a unique key can be formed. In the illustrated example case, the format of the key will be '<tenant ID>.<network ID>.<node ID>'. The microfunction implementing the functionality of this node will be associated with this unique key.

A full key can be used when performing writes and reads from the KVS. In the example, a full key of the first input node will be abba.cafe.1. In the example, the first prefix is the tenant id "abba," which is concatenated with the network id "cafe," which is concatenated with the node id "1," to form the full unique key "abba.cafe.1" that identifies the node 1 in the neural network. In order to get a result from the neural network, an application can monitor all output nodes for new values to appear or the network can write the output to a specific key. In the illustrated example of FIG. 3 the neural network will write output to key "abba.cafe.result."

Figure 4:
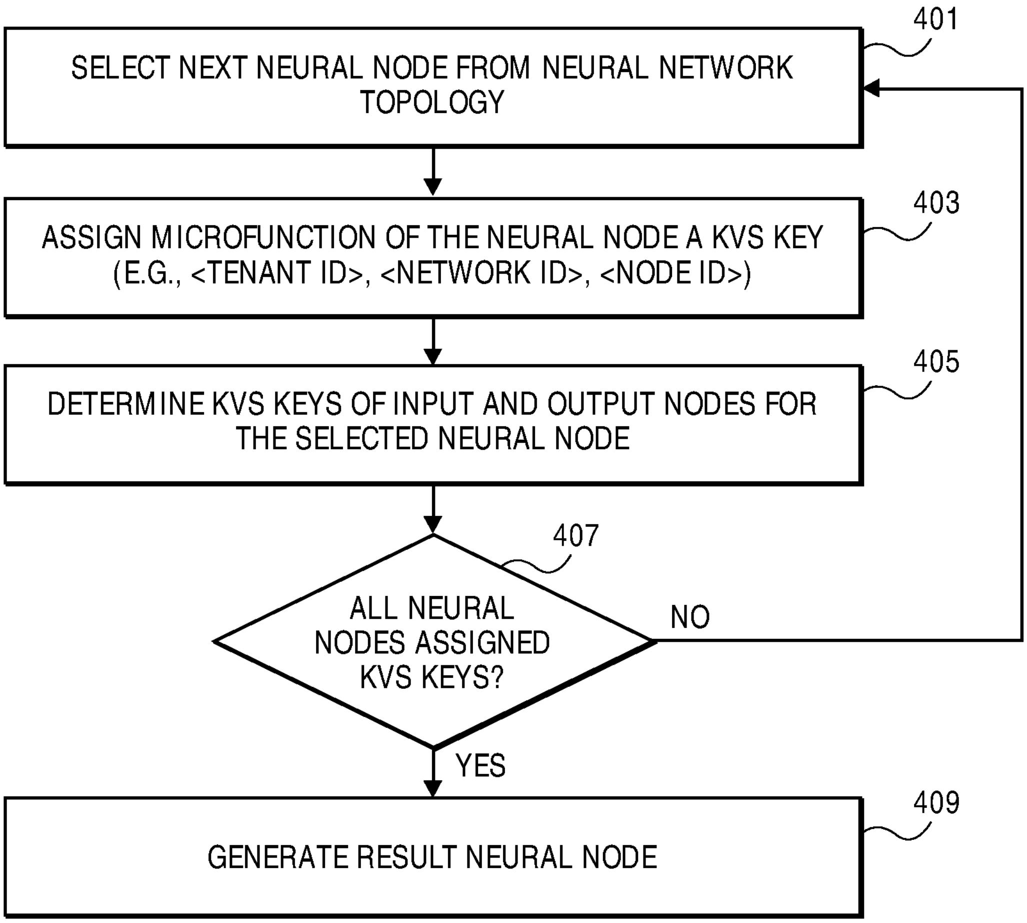
FIG. 4 is a flowchart of one embodiment of a process for encoding a neuron into a key for a KVS system.

FIG. 4 is a flowchart of one embodiment of a process for encoding a neuron into a key for a KVS system. This process can be triggered when a neural network is imported, configured, or similarly loaded into the distributed machine learning architecture. The process can start by selecting one of the neural nodes from the neural network topology being configured into the distributed machine learning architecture (Block 401). The nodes of the neural network topology can be traversed in any order using any algorithm for selection. The placement of the node in the neural network is utilized to determine a set of prefixes to form a unique key for the node (Block 403). For example, the prefixes <tenant ID>, <network ID>, and <node ID>. The microfunction can implement the function or algorithm of the neuron or can implement other related functions for implementing the neural network, in particular the attached node. The process also determines the keys for input nodes and output nodes of the selected node in the neural network topology (Block 405). The same prefix scheme is utilized to determine the keys of the input and output nodes. With the KVS key attached to the associated microfunction and the input and output KVS keys determined for monitoring input and output by the microfunction, then the node processing is complete, and a check can be made to determine whether additional nodes remain to be processed (Block 407). If additional nodes remain to be processed, then the process selects the next node in the neural network topology (Block 401). If the process has traversed all of the nodes of the neural network then the process can generate a result node for the neural network (Block 409), which can be accessible to external applications.

FIGS. 5A-5D are diagrams of an example of data values associated with each node over time. The illustrated sequence of data shows different stages of how values traverse through the neural network as KVS key based input and output. The first phase of the neural network starts with empty neural network state. In the second phase, input nodes are populated with some values. This is performed by application(s) writing the values to specific keys (abba.cafe.1, abba.cafe.2, abba.cafe.3) of the input nodes. The third stage shows the KVS state after a microfunction attached to key abba.cafe.1 has been executed. In this case, it will process the value at abba.cafe.1 and write input to the hidden nodes 4 to 7 with a value it calculates internally. The fourth phase shows state after the value at abba.cafe.2 value is processed by a microfunction attached to this key. In this case, the value is written to keys abba.cafe.4, abba.cafe.5, abba.cafe.6, and abba.cafe.7. Similarly, the third input node writes its values to these keys. Once all input data is passed to the keys of the first hidden layer, microfunctions attached to these keys will process the input data and write data to the next layer of hidden nodes. The KVS state after this step is shown in stage 6. In this case, each microfunction calculates an output value and writes it to each of the output keys abba.cafe.8, abba.cafe.9, abba.cafe.a and abba.cafe.b. In the following stage, the output from these microfunctions are written to the output layer nodes, abba.cafe.c, abba.cafe.d and abba.cafe.e. Microfunctions attached to the output neurons will calculate the final result values, and in this example, write these values to the abba.cafe.result key. In this example, the given input has resulted in classification of a neuron represented by node abba.cafe.d.

If the KVS system is not configured to provide functionality to aggregate inputs or multicast outputs to keys, then the attached microfunctions can be configured to handle this internally. An example JSON representation of data for this purpose is shown below:

```
Data JSON:
{
```

-continued

```
    'from' : <node ID>,
    'to' : <node ID>,
    'value' : <numerical value>
    }
```

Code Section 1, above, is an example encoding for sending input and output data between neuron microfunctions.

```
[
    {
        'input' : 1,
        'data' : {<data JSON>}
    },
    {
        'input' : 2,
        'data' : {<data JSON>}
    },
    ...
    {
```

Code Section 2, above, is an example format to store data JSONs internally in a neuron microfunction. Data JSON in code section 1 includes identifiers of the source and destination nodes and the actual data passed between the nodes. When a node receives the data in this format it can verify that the data was in fact meant for it and that the sender is listed as input for this node. When a node has more than one input it can be configured with information about each node that can send input to it. An example of the data structure for this is shown in code section 2. Since this input may come out of order from each of the input nodes, the node needs to store inputs internally (in a KVS key) until all data is received and then it can handle the data. Once data has been processed and outputs written, the data can be re-initialized for the next round of inputs. For the purpose of writing outputs, the node is configured with the information of each node to which it is configured to provide output. Based on the computation result this data is then written to each key associated with the output nodes.

In another embodiment, an alternative way of handling input and output is to collocate the computational neural network nodes with a helper microfunction that can aggregate data similarly as described above. This makes the implementation of the computation node simpler and it only requires reading one single input and writing one single output. These kinds of data aggregation and multicasting microfunction should be part of the microfunction framework and the usage of them should be a configuration time decision.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
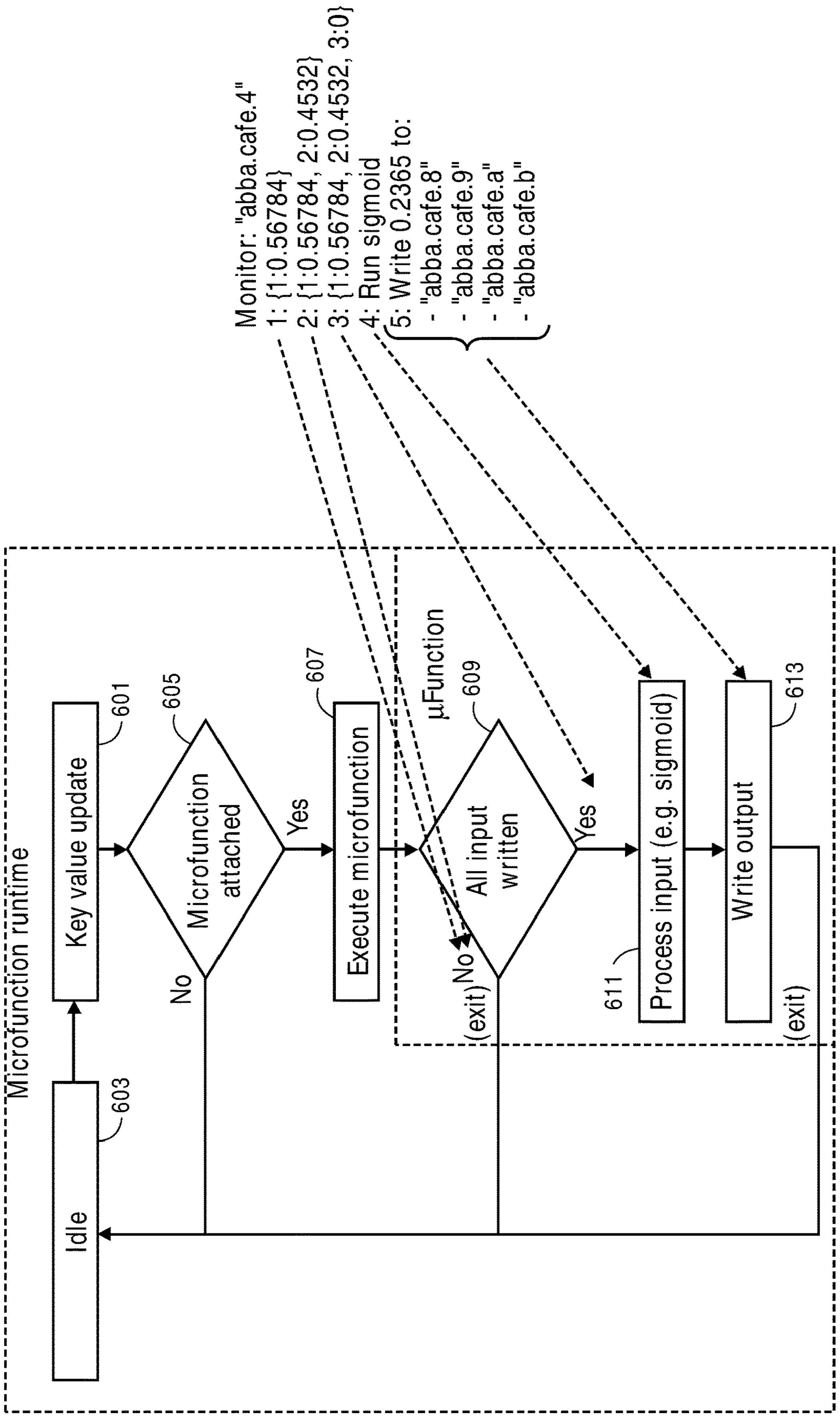
FIG. 6 is a diagram of one embodiment a process for runtime environment microfunction execution.

FIG. 6 is a diagram of one embodiment a process for runtime environment microfunction execution. The flowchart is one embodiment of a process for data handling in the distribute machine learning architecture with a KVS system and a microfunction runtime environment collocated with it.

The process shows how data is handled using the example of hidden neuron 4 in the example neural network described herein above.

The process of the microfunction runtime environment continuously checks for updates to key values (Block 601). If there are no updates to keys in the KVS system, then the process can remain in an idle state (Block 603). If there is an update to a key in the KVS system, then the microfunction runtime environment determines whether there is a microfunction attached to the updated kay (Block 605). For example, input data for neuron 4 can be written to key abba.cafe.4. When this key is updated the microfunction runtime environment will check if there is a microfunction attached with the key. If there is no microfunction attached to an updated key, then the process continues to idle (Block 603) until another update of a key is detected.

If there is an attached microfunction for an updated key in the KVS system, then the microfunction runtime environment starts execution of the microfunction (Block 607). The attached microfunction will be executed every time the associated key is updated. The microfunction can check to determine if all of the input nodes and associated keys have been updated, i.e., all of the expected inputs have been written to respective keys of input nodes (Block 609). If all of the expected input has not been written to the respective keys, then the process continues to idle until the next update of keys (Block 603). In the example neural network, in the first phase only input data from neuron 1 has been written, hence the microfunction for node 4 exits. Similarly, in the second stage not all input has been written so the microfunction for node 4 exits. After input node 3 has also added its input the microfunction for node 4 can process the complete set of input data.

When all of the expected input has been written to the associated keys, then the microfunction processes the input according to its configured algorithm (Block 611). In the example, a sigmoid function is executed (this is a function running inside a neuron, but other functions could be executed in addition to or instead of sigmoid, e.g., a rectifier linear unit (ReLU)). The output from the processing is written to all output keys (Block 613) and then the process returns to idle until the next update. In the example, the microfunction of node 4 writes output to abba.cafe.8, abba.cafe.9, abba.cafe.a, and abba.cafe.b. Once the output is written the microfunction exits. Before exiting, the microfunction can flush the input key and/or the input and output values can be stored for future reference. Writing the output values can trigger the microfunction runtime environment to execute the microfunctions associated with the updated keys.

Figure 7:
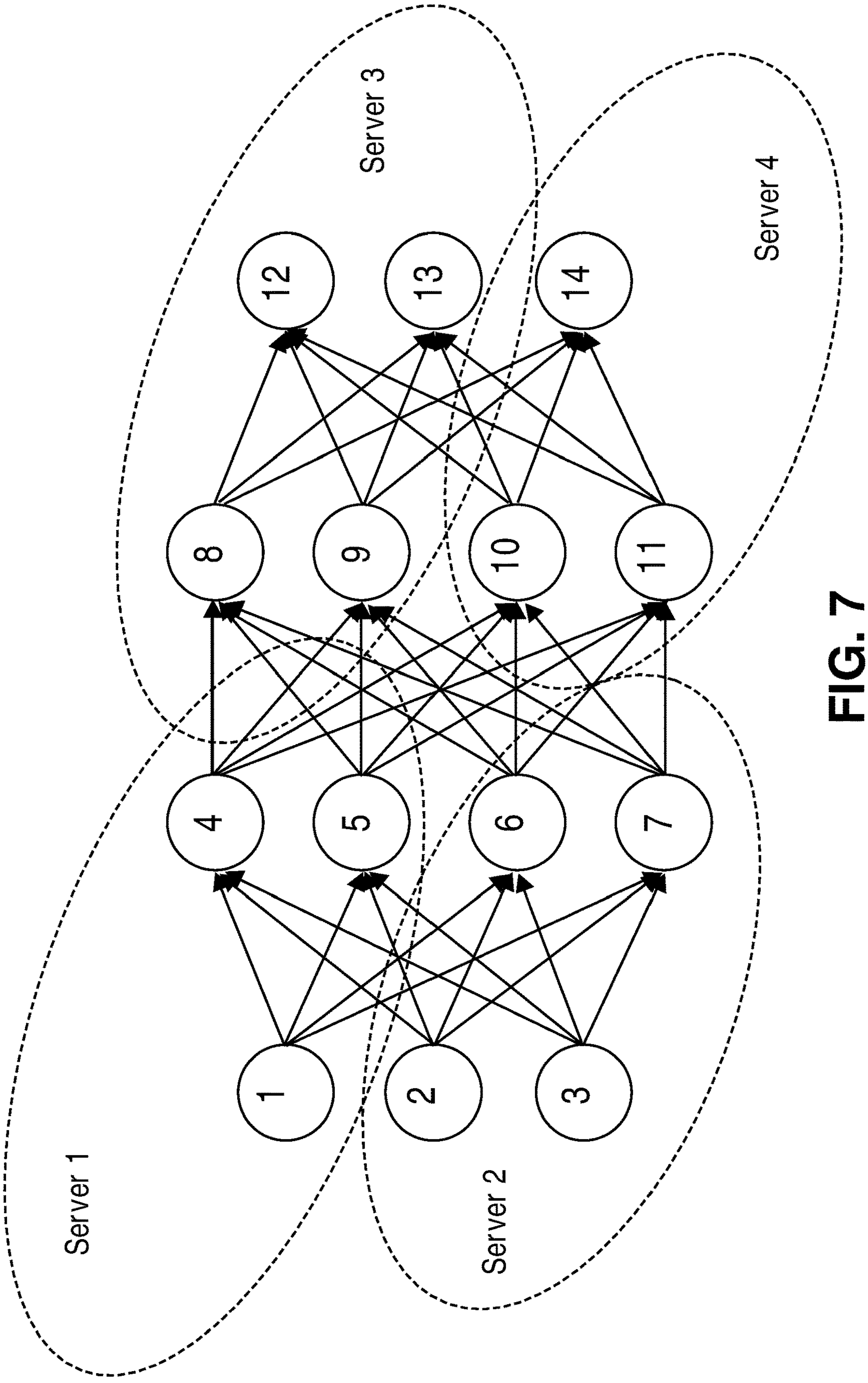
FIG. 7 is a diagram of distribution of a single neural network over multiple physical servers.

FIG. 7 is a diagram of distribution of a single neural network over multiple physical servers. The distributed machine learning architecture described herein can be flexible to adapt to the resources available. The illustrated example includes a network for a set of four servers. The nodes can be distributed in any manner by the distributed machine learning architecture between the four servers while maintaining the topology and relationships between the nodes in the neural network.

Figure 8:
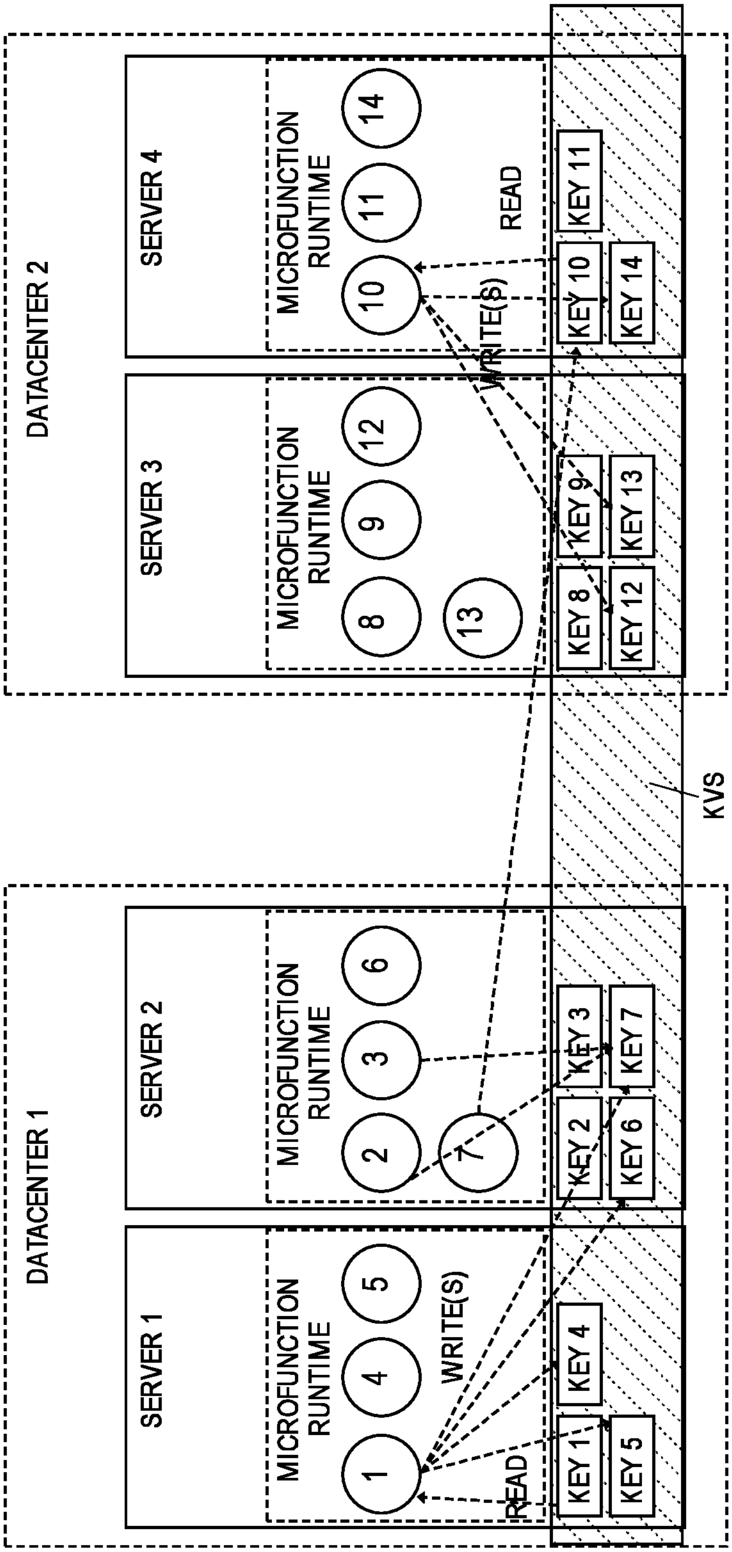
FIG. 8 is a diagram of a distribution of neural network neurons and connections to microservice architecture in KVS.

FIG. 8 is a diagram of a distribution of neural network neurons and connections to microservice architecture in KVS. The example of FIG. 8 is further clarified with the nodes being executed by the microfunction runtime environments of each of the respective servers 1-4. Each of the nodes is attached to a key in the KVS system and configured to read or write from other keys in response to updates to those keys as discussed herein above. The illustration shows a subset of the relationships between nodes and keys in the context of the example network. For example, the node 1 running on server 1 reads from key 1 and writes to keys 4, 5, 6, and 7 irrespective of the location of the nodes and keys. The keys of each attached node are co-located on the same server to optimize compute within the distributed machine learning architecture.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general-purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general-purpose network device 904 includes hardware 940 comprising a set of one or more processor(s) 942 (which are often COTS processors) and physical NIs 946, as well as non-transitory machine-readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R. The applications 964A-R can include the microfunction runtime environment 965, which implements the monitoring of KVS values and execution of associated microfunctions as discussed herein above.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
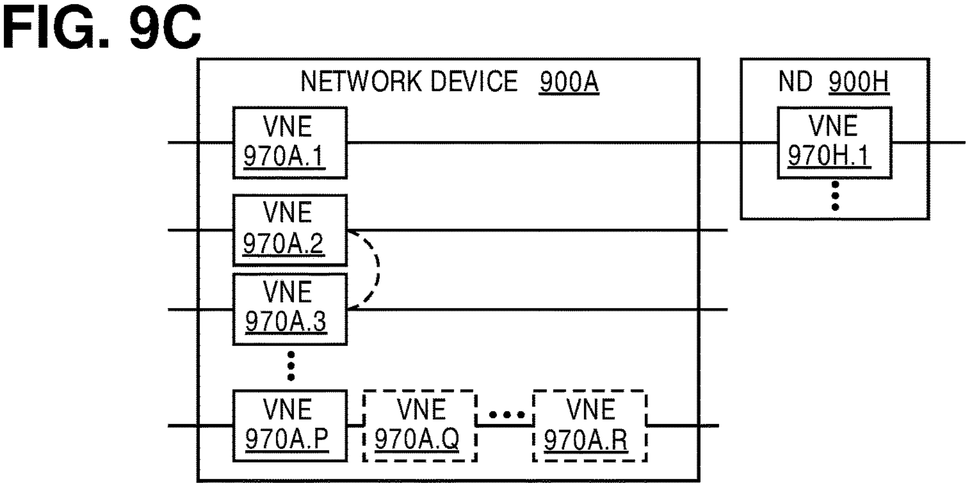
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
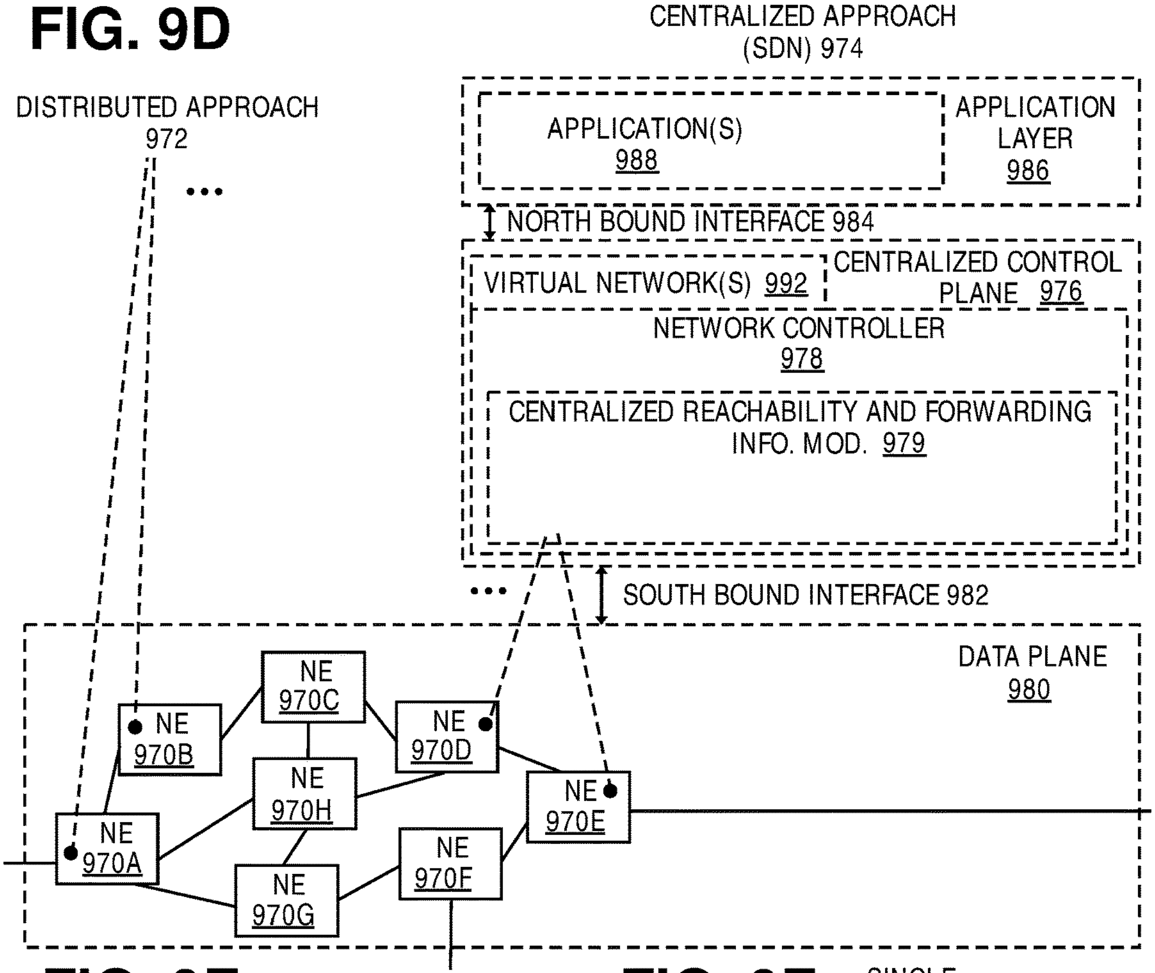
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general-purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general-purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The applications 988 can include the microfunction runtime environment 981, which implements the monitoring of KVS values and execution of associated microfunctions as discussed herein above.

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974 but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively, or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
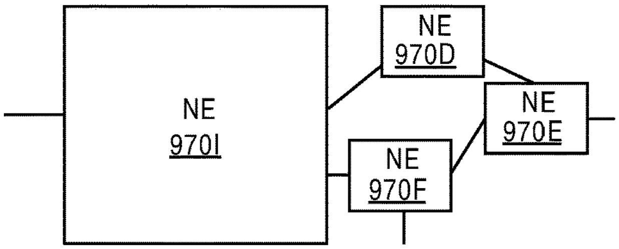
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
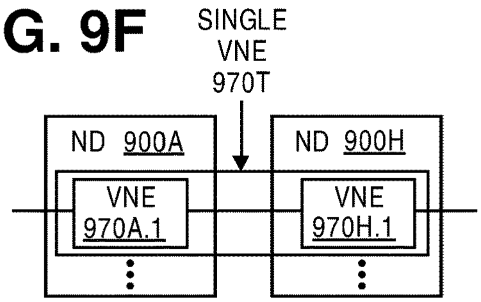
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments of the invention. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
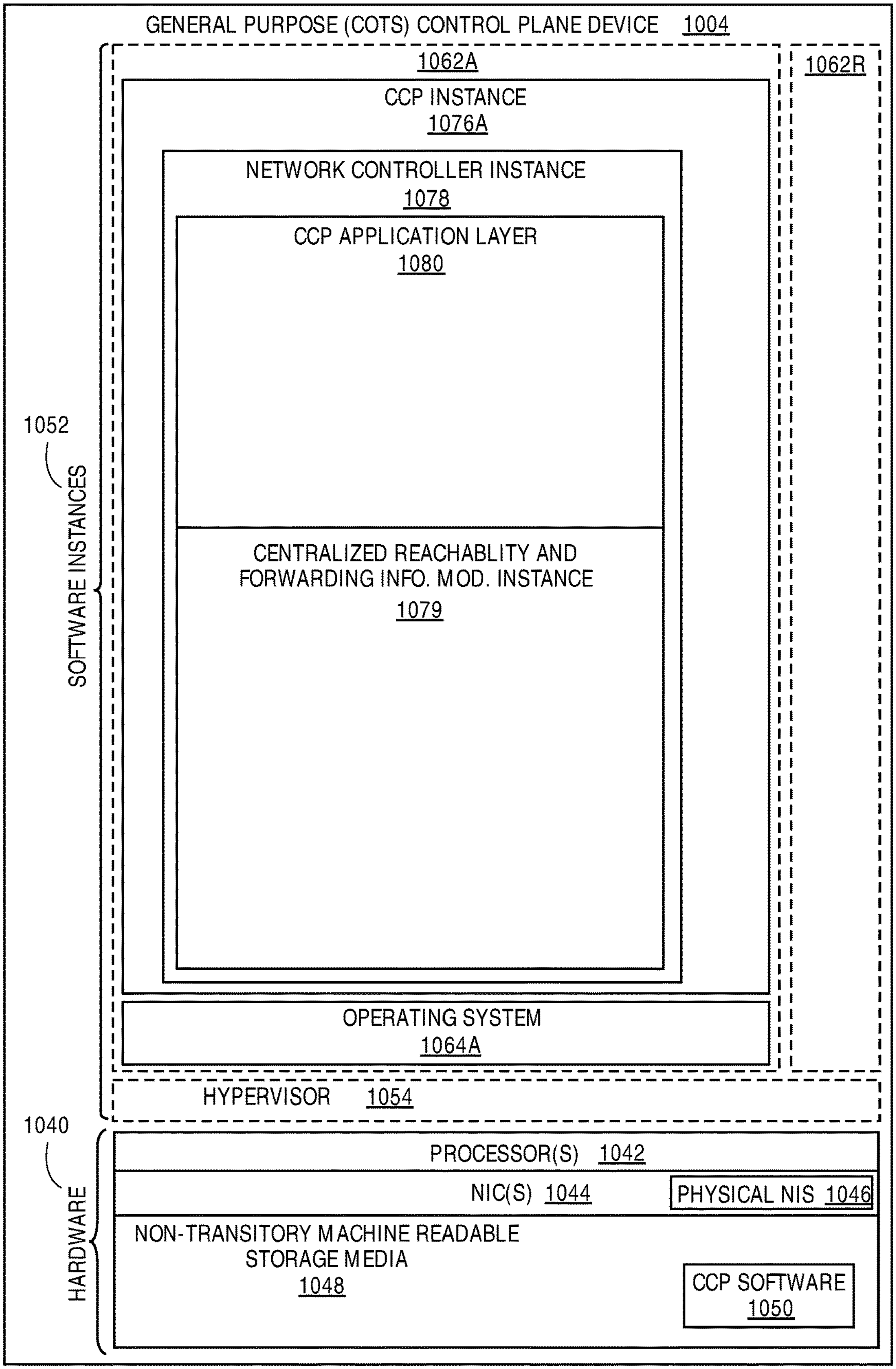
FIG. 10 illustrates a general-purpose control plane device with centralized control plane (CCP) software 1050), according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general-purpose control plane device 1004 including hardware 1040 comprising a set of one or more processor(s) 1042 (which are often COTS processors) and physical NIs 1046, as well as non-transitory machine-readable storage media 1048 having stored therein centralized control plane (CCP) software 1050.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view. The applications layer 1080 can include the microfunction runtime environment 1081, which implements the monitoring of KVS values and execution of associated microfunctions as discussed herein above.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for implementing a neural node in a neural network comprising a plurality of neural nodes in a key value store (KVS) cluster, the KVS cluster comprising a grouping of servers that implement a distributed KVS system configured to provide a serverless cloud native compute with a microfunction as a service framework, wherein a respective KVS key is associated with each neural node, the method comprising:

processing to assign neural nodes of the neural network across the grouping of servers with each neural node and respective KVS key co-located on a same server and with each neural node having a unique identifier to identify node location within the neural network and location within the grouping of servers;

processing to assign a microfunction of the neural node a first KVS key, wherein the neural node, the microfunction of the neural node, and the first KVS key are implemented at a same server among the grouping of servers;

monitoring, by a microfunction runtime environment which checks for updates of KVS keys, a first KVS key for the neural node for an update of an input value to the neural node;

executing the microfunction for the neural node by the same server associated with the neural node, the microfunction of the neural node, and the first KVS key on the input value to generate an output value from the neural node, when detecting the update of the input value to the neural node; and writing the output value from the neural node to at least a second neural node located at the same server to indicate an update from the neural node to update a second KVS key associated with the second neural node.

2. The method of claim 1, further comprising:

determining whether all input values to the neural node have been updated before executing the microfunction and writing the output value to the second neural node.

3. The method of claim 1, further comprising:

assigning the microfunction the first KVS key as a combination of a tenant identifier, a network identifier and a neural node identifier.

4. The method of claim 3, wherein the tenant identifier, network identifier, and neural node identifier are concatenated to form the first KVS key.

5. A network device implementing a neural node in a neural network comprising a plurality of neural nodes in a key value store (KVS) cluster, the KVS cluster comprising a grouping of servers that implement a distributed KVS system configured to provide a serverless cloud native compute with a microfunction as a service framework, wherein a respective KVS key is associated with each neural node, the network device comprising:

a computer-readable medium having stored therein a microfunction runtime environment; and a processor coupled to the computer-readable medium, the processor to execute the microfunction runtime environment to:

assign neural nodes of the neural network across the grouping of servers with each neural node and respective KVS key co-located on a same server and with each neural node having a unique identifier to identify node location within the neural network and location within the grouping of servers;

assign a microfunction of the neural node a first KVS key, wherein the neural node, the microfunction of the neural node, and the first KVS key are implemented at a same server among the grouping of servers;

monitor, by the microfunction runtime environment which checks for updates of KVS keys, a first KVS key for the neural node for an update of an input value to the neural node;

execute the microfunction for the neural node by the same server associated with the neural node, the microfunction of the neural node, and the first KVS key on the input value to generate an output value from the neural node, when detecting the update of the input value to the neural node; and writing the output value from the neural node to at least a second neural node located at the same server to indicate an update from the neural node to update a second KVS key associated with the second neural node.

6. The network device of claim 5, wherein the microfunction runtime environment is further to determine whether all input values to the neural node have been updated before executing the microfunction and writing the output value to the second neural node.

7. The network device of claim 5, wherein the microfunction runtime environment is further to assign the microfunction the first KVS key as a combination of a tenant identifier, a network identifier and a neural node identifier.

8. The network device of claim 7, wherein the tenant identifier, network identifier, and neural node identifier are concatenated to form the first KVS key.

9. A non-transitory computer-readable medium having stored therein a set of instructions, which when executed by a computing system, cause the computing system to perform a set of operations on a neural node in a neural network comprising a plurality of neural nodes in a key value store (KVS) cluster, the KVS cluster comprising a grouping of servers that implement a distributed KVS system configured to provide a serverless cloud native compute with a microfunction as a service framework, wherein a respective KVS key is associated with each neural node, the set of operations comprising:

processing to assign neural nodes of the neural network across the grouping of servers with each neural node and respective KVS key co-located on a same server and with each neural node having a unique identifier to identify node location within the neural network and location within the grouping of servers;

processing to assign a microfunction of the neural node a first KVS key, wherein the neural node, the microfunction of the neural node, and the first KVS key are implemented at a same server among the grouping of servers;

monitoring, by a microfunction runtime environment which checks for updates of KVS keys, a first KVS key for the neural node for an update of an input value to the neural node;

executing the microfunction for the neural node by the same server associated with the neural node, the microfunction of the neural node, and the first KVS key on the input value to generate an output value from the neural node, when detecting the update of the input value to the neural node; and writing the output value from the neural node to at least a second neural node located at the same server to indicate an update from the neural node to update a second KVS key associated with the second neural node.

10. The non-transitory computer-readable medium of claim 9, having further instructions stored therein causing the computing system to perform operations further comprising:

determining whether all input values to the neural node have been updated before executing the microfunction and writing the output value to the second neural node.

11. The non-transitory computer-readable medium of claim 9, having further instructions stored therein causing the computing system to perform operations further comprising:

assigning the microfunction the first KVS key as a combination of a tenant identifier, a network identifier and a neural node identifier.

* * * * *